(12) United States Patent　　(10) Patent No.: US 12,475,558 B1
Mannino et al.　　(45) Date of Patent: Nov. 18, 2025

(54) CAPILLARY REFILL IMAGE PROCESSING SYSTEMS AND PROCESSES

(71) Applicant: Sanguina, Inc., Peachtree Corders, GA (US)

(72) Inventors: Robert Guy Mannino, Atlanta, GA (US); Erika Amy Tyburski, Norcross, GA (US); Wilbur Aaron Lam, Decatur, GA (US)

(73) Assignee: SANGUINA, INC., Peachtree Corners, GA (US)

( * ) Notice: Subject to any disclaimer, the term of this patent is extended or adjusted under 35 U.S.C. 154(b) by 435 days.

(21) Appl. No.: 18/183,146

(22) Filed: Mar. 13, 2023

(51) Int. Cl.
　　*G06T 7/00*　　(2017.01)
　　*G06T 7/90*　　(2017.01)
(52) U.S. Cl.
　　CPC ............... *G06T 7/0012* (2013.01); *G06T 7/90* (2017.01); *G06T 2207/10016* (2013.01); *G06T 2207/10024* (2013.01); *G06T 2207/20081* (2013.01); *G06T 2207/30104* (2013.01)
(58) Field of Classification Search
　　CPC ...................... G06T 7/0012; G06T 7/90; G06T 2207/10016; G06T 2207/10024; G06T 2207/20081; G06T 2207/30104
　　See application file for complete search history.

(56) References Cited

U.S. PATENT DOCUMENTS

| | | | | |
|---|---|---|---|---|
| 2022/0087538 A1* | 3/2022 | Hollander | ........... | A61B 5/14551 |
| 2022/0133241 A1* | 5/2022 | Jones | .................. | A61B 5/1032 600/485 |

OTHER PUBLICATIONS

NPL: 2005-2023.*

* cited by examiner

*Primary Examiner* — Quang N Vo
(74) *Attorney, Agent, or Firm* — Husch Blackwell LLP; Bryan D. Stewart (57) ABSTRACT

The present disclosure relates to a process that comprises, in at least one embodiment: accessing a camera via an application; prompting a user to induce blanching for a time period of 10 seconds; processing information from the camera to automatically detect one or more fingernails for each of the one or more fingers; accessing video data from the camera; computing a capillary refill time; causing a display screen to display the capillary refill time; and transmitting the capillary refill time to a computing device.

20 Claims, 7 Drawing Sheets

CAPILLARY REFILL IMAGE PROCESSING SYSTEMS AND PROCESSES

BACKGROUND

Several attempts have been made to create more objective capillary refill test (CRT) using digitized techniques, including computer processing and re-designed pulse oximeters. However, complex instrumentation have rendered the solutions impractical for bedside care. Furthermore, current quantitative approaches have not leveraged quantitative capillary refill time (Q-CRT) data to its fullest potential. Such data may be used for many purposes, including, fully characterizing how the capillary bed refills within a CRT measurement (e.g., the dynamics of capillary refill flow profile, the "area under the curves," the "shape" of the waveforms, and the peak-to-peak variability), analyzing repeated measurements, and analyzing color intensity in order to unlock potential predictive indicators based on disease state. Q-CRT data is useful for more than just determining capillary refill time.

Therefore, there is a long-felt, but unmet need for improved image processing systems and processes for determining CRT and other related data.

BRIEF DESCRIPTION OF THE DISCLOSURE

A simple, Q-CRT method that does not require additional equipment or training with high temporal resolution and predictive information has the potential to transform chronic disease management and expand healthcare to hospital, point-of-care, and home settings. Such a tool may be accessible and scalable and can be translated into general use. Various embodiments of the present disclosure are directed to image processing with high temporal resolution for measuring Q-CRT as a metric of peripheral perfusion. In at least one embodiment, the image processing described herein may be accomplished regardless of a patient's age, skin tone, and disease state.

According to a first aspect, the present disclosure includes a process comprising: accessing a camera via an application; prompting a user to induce blanching for a time period of 10 seconds; processing information from the camera to automatically detect one or more fingernails for each of the one or more fingers; accessing video data from the camera, the video data comprising: at least 10 frames per second over the time period; and a video of the one or more detected fingernails transitioning from a pressure condition to a relaxed condition; computing a capillary refill time by: computing a point in time of a maximum pixel color intensity for the time period; computing a point in time of a minimum pixel color intensity for the time period; and computing the capillary refill time between the point in time of the maximum pixel color intensity and the point in time of the minimum pixel color intensity; causing a display screen to display the capillary refill time; and transmitting the capillary refill time to a computing device.

In a second aspect of the process of the first aspect or any other aspect, wherein the one or more fingers comprise at least two fingers.

In a third aspect of the process of the second aspect or any other aspect, wherein the one or more fingernails comprise at least two fingernails.

In a fourth aspect of the process of the third aspect or any other aspect, wherein the video data comprises pixel color intensity data for each of the at least two fingers.

In a fifth aspect of the process of the fourth aspect or any other aspect, wherein the process further comprises computing: a local maximum pixel color intensity for each of the at least two fingers; a local minimum pixel color intensity for each of the at least two fingers; an average maximum pixel color intensity based on the maximum pixel color intensity for each of the at least two fingers; and an average minimum pixel color intensity based on the minimum pixel color intensity for each of the at least two fingers.

In a sixth aspect of the process of the fifth aspect or any other aspect, wherein: the maximum pixel color intensity comprises the average maximum pixel color intensity; and the minimum pixel color intensity comprises the average minimum pixel color intensity.

In a seventh aspect of the process of the sixth aspect or any other aspect, wherein processing information from the camera to automatically detect one or more fingernails for each of the one or more fingers comprises processing information via a machine learning model configured to detect at least one fingernail from camera data.

In an eighth aspect of the process of the seventh aspect or any other aspect, wherein the machine learning model was previously developed.

According to a ninth aspect, the present disclosure includes a process comprising: accessing a camera; prompting a user to apply pressure to one or more fingers onto a surface for a time period; processing information from the camera to automatically detect one or more fingernails for each of the one or more fingers; prompting a user to release pressure from the one or more fingers; accessing video data from the camera, the video data comprising a video of the one or more detected fingernails transitioning from a pressure condition to a relaxed condition; computing a capillary refill time by: computing a point in time of a maximum pixel color intensity for the time period; computing a point in time of a minimum pixel color intensity for the time period; and computing the capillary refill time between the point in time of the maximum pixel color intensity and the point in time of the minimum pixel color intensity; and causing a display screen to display the capillary refill time.

In a tenth aspect of the process of the ninth aspect or any other aspect, wherein accessing the camera comprises accessing the camera via a computing application.

In an eleventh aspect of the process of the tenth aspect or any other aspect, wherein the one or more fingers comprise at least two fingers.

In a twelfth aspect of the process of the eleventh aspect or any other aspect, wherein the one or more fingernails comprise at least two fingernails.

In a thirteenth aspect of the process of the twelfth aspect or any other aspect, wherein the video data comprises pixel color intensity data for each of the at least two fingers.

In a fourteenth aspect of the process of the thirteenth aspect or any other aspect, wherein the process further comprises computing: a local maximum pixel color intensity for each of the at least two fingers; a local minimum pixel color intensity for each of the at least two fingers; an average maximum pixel color intensity based on the maximum pixel color intensity for each of the at least two fingers; and an average minimum pixel color intensity based on the minimum pixel color intensity for each of the at least two fingers.

In a fifteenth aspect of the process of the fourteenth aspect or any other aspect, wherein: the maximum pixel color intensity comprises the average maximum pixel color intensity; and the minimum pixel color intensity comprises the average minimum pixel color intensity.

In a sixteenth aspect of the process of the fifteenth aspect or any other aspect, wherein processing information from the camera to automatically detect one or more fingernails for each of the one or more fingers comprises processing information via a machine learning model configured to detect at least one fingernail from camera data.

In a seventeenth aspect of the process of the sixteenth aspect or any other aspect, wherein the machine learning model was previously developed.

In an eighteenth aspect of the process of the seventeenth aspect or any other aspect, wherein the time period comprises about 10 seconds.

In a nineteenth aspect of the process of the seventeenth aspect or any other aspect, wherein the video data from the camera comprises at least 60 frames per second over the time period.

In a twentieth aspect of the process of the seventeenth aspect or any other aspect, wherein the process further comprises transmitting the capillary refill time to a computing device.

According to a twenty-first aspect, the present disclosure includes an image processing system comprising: a memory storing a developed machine learning model; and a processor communicably connected to the memory, the processor configured for: accessing a camera via an application; prompting a user to press one or more fingers onto a surface for a time period of 10 seconds; processing information from the camera via the machine learning model to automatically detect one or more fingernails for each of the one or more fingers; prompting a user to relax the one or more fingers; accessing video data from the camera, the video data comprising: at least 60 frames per second over the time period; and a video of the one or more detected fingernails transitioning from a pressure condition to a relaxed condition; computing a capillary refill time by: computing a point in time of a maximum pixel color intensity for the time period; computing a point in time of a minimum pixel color intensity for the time period; and computing the capillary refill time between the point in time of the maximum pixel color intensity and the point in time of the minimum pixel color intensity; causing a display screen to display the capillary refill time; and transmitting the capillary refill time to a computing device.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The disclosure will now be described with reference to the drawing figures, in which like reference numerals refer to like parts throughout. For purposes of clarity in illustrating the characteristics of the present disclosure, proportional relationships of the elements have not necessarily been maintained in the drawing figures.

Poor peripheral perfusion or circulation affects over 400 million people each year, including patients with peripheral vascular disease and patients over the age of sixty. This condition often co-exists with other conditions such as dehydration and/or hypovolemia, sepsis and/or shock, cardiac and vascular diseases, chronic lung diseases, diabetes, obesity, blood diseases such as sickle cell anemia, and many other conditions. Poor circulation leads to a lack of oxygen being provided to vital organs, which can cause further complications. Such complications include a decreased ability for the body to heal and to fight infection, an increased chance of developing skin ulcers and thromboses, and in severe cases, possible amputation of affected limbs, cardiovascular failure, and stroke.

Therefore, prompt recognition of poor perfusion and poor circulation is paramount for improving patient health outcomes and quality of life, especially for critically ill patients. Perfusion is currently assessed as a part of routine clinical care via a CRT test done by a healthcare provider. The clinician applies pressure to a patient's finger or fingernail, allowing the region to blanch or become pale in color, then releases the finger, allowing the clinician to visualize the time it takes for capillary blood to refill under the fingernail and/or fingertip. A refill rate longer than two seconds is typically considered abnormal, and a refill rate of two seconds or less is typically considered normal.

However, this standard CRT test is subjective and binary. Although the simplicity of the test allows for any clinical professional to administer the test, results are determined via the naked eye and may be highly subjective. Additionally, the results may be limited to the resolution of seconds, rendering this to be a technique with a binary readout (normal/abnormal). As the consequences for poor circulation can become severe very quickly, there is a need to closely monitor changes thereof. Specifically, there is a need for a simple, quantitative, high resolution CRT technique that can be used both in clinics and at home and which can measure, track, and report results over time.

Therefore, a simple, Q-CRT method that does not require additional equipment or training and that has high temporal resolution and predictive information has the potential to transform chronic disease management and expand healthcare in various settings. Such a tool would be accessible and scalable and can be translated into general use. Various embodiments of the present disclosure are directed to image processing using a smartphone application with high temporal resolution for measuring Q-CRT as a metric of peripheral perfusion. In at least one embodiment, the image processing described herein may be accomplished regardless of a patient's age, skin tone, and disease state.

A system is described herein which may be configured to capture and analyze images and video to derive information from patient Q-CRT data. Specifically, a camera may capture images and video, and a processor may analyze the captured images and video. The system may derive information from the analysis and may display such data to a patient via a graphical user interface. In various embodiments, applications, systems, and processes described herein may include or be used upon a smartphone, and thus, the patient and/or provider does not need to purchase specialized hardware.

Figure 1:
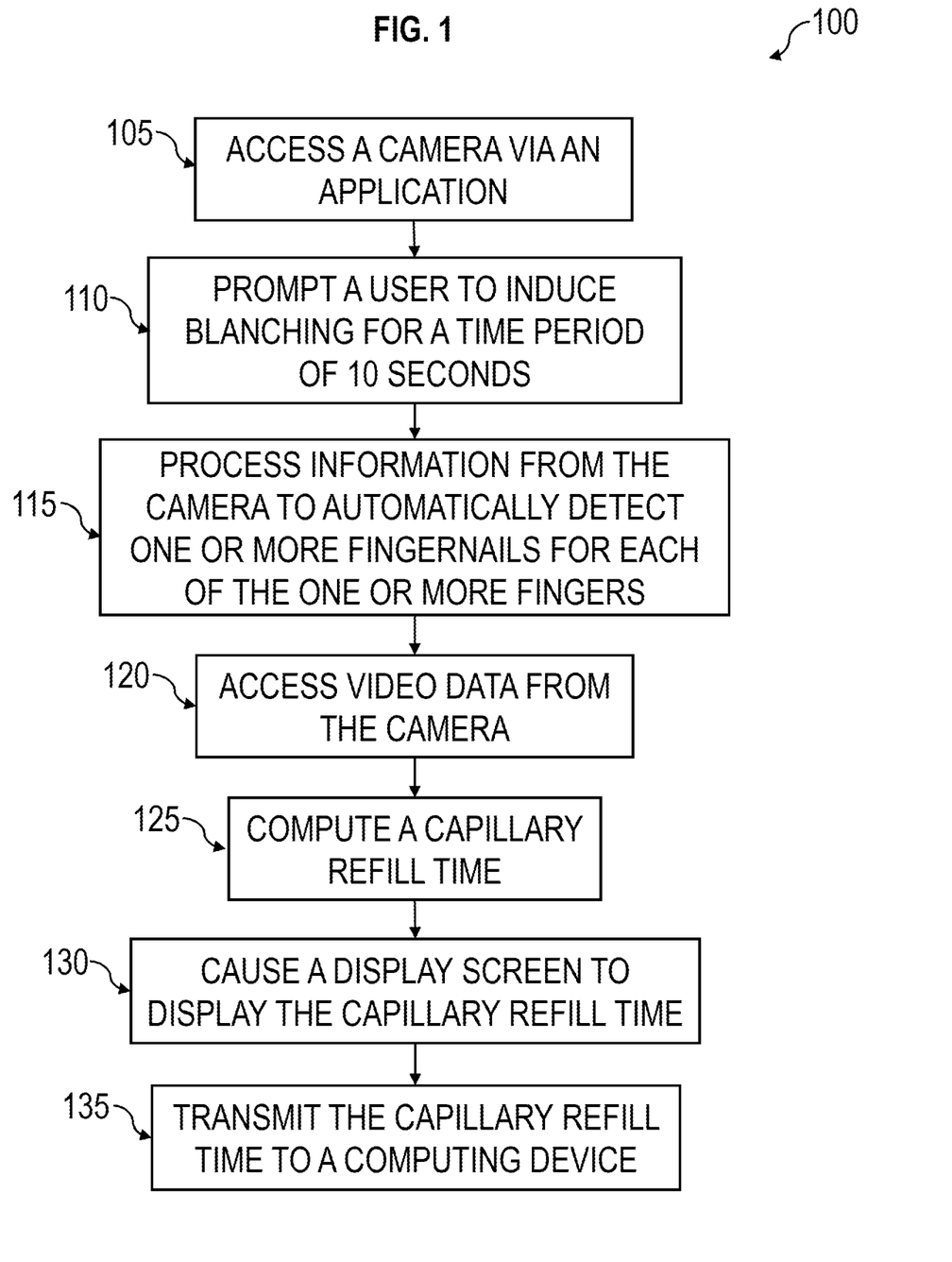
FIG. 1 is a flow diagram of an image processing process for computing capillary refill time according to embodiments of the present disclosure.

FIG. 1 is a flow diagram of an image processing process 100 for computing capillary refill time, according to various embodiments of the present disclosure.

At step 105, the system may access a camera via an application. In some embodiments, the system may access the camera locally (e.g., on a user device), or may access the camera remotely. This local and/or remote access may allow for in-clinic or virtual monitoring of a patient's symptoms. Alternatively, in embodiments, a separate device or specific type of computing device, each of which may include a camera and an application, may access the camera. As will be understood from discussions herein, the camera may be accessed by a remote server or the like.

As discussed herein, the system may access the camera in any suitable way. In at least one embodiment, the system may access the camera via an application. According to one embodiment, the system may access the camera immediately after an application is launched. A patient may open an application, and the camera may become immediately available for capturing of images and video. In some embodiments, the system may access the camera via firmware, third-party software, or other mechanism. The system may be pre-programmed to access the camera in various manners.

At step 110, the system may prompt the user to induce blanching for any time period. The time period may be any range, including at least ten seconds. In one embodiment, a patient presses her fingers onto a surface for ten seconds in order to blanch her fingernail. According to various embodiments, the system may prompt a patient to press her fingers onto a surface after the patient opens an application on the patient's device. In one embodiment, the system may prompt the user via firmware, third-party software, or other mechanism.

At step 115, the system may process information from the camera to automatically detect one or more fingernails for each of the one or more fingers. According to one embodiment, the system may process the information within the patient's device via an application. In various embodiments, the system may process the information remotely or locally and may process the information via firmware, third-party software, or other mechanism. Such automatic detection may allow for a patient to take an image or video of her hand, and the system may process the image and video to detect the fingernail.

At step 120, the system may access video data from the camera. The video data may comprise at least 60 frames per second over the time period; and a video of the one or more detected fingernails transitioning from a pressure condition to a relaxed condition. According to various embodiments, the video data may be collected from any number of fingers. The system may process information from data from one finger. In one embodiment, the system may process information from data from multiple fingers. When such data is collected, in one embodiment, the system may output an average of the data across each of the fingernails. According to various embodiments, the system may output a range of the data based on data from each of the fingernails.

At step 125, the system may compute a capillary refill time. The system may compute the capillary refill time by computing a point in time of a maximum pixel color intensity for the time period, computing a point in time of a minimum pixel color intensity for the time period, and computing the capillary refill time between the point in time of the maximum pixel color intensity and the point in time of the minimum pixel color intensity. According to various embodiments, the system may determine at which point the capillary refill is at its maximum pixel color intensity. In one embodiment, the system may determine at which point the capillary refill is at its minimum pixel color intensity. In various embodiments, the system may average the capillary refill time and may compute such average no matter the number of fingernails being assessed. The system may correlate a time period to such maximums, minimums, and averages.

At step 130, the system may cause a display screen to display the capillary refill time. The system may display information in various manners as discussed herein. At step 135, the system may transmit the capillary refill time to a computing device.

Figure 2:
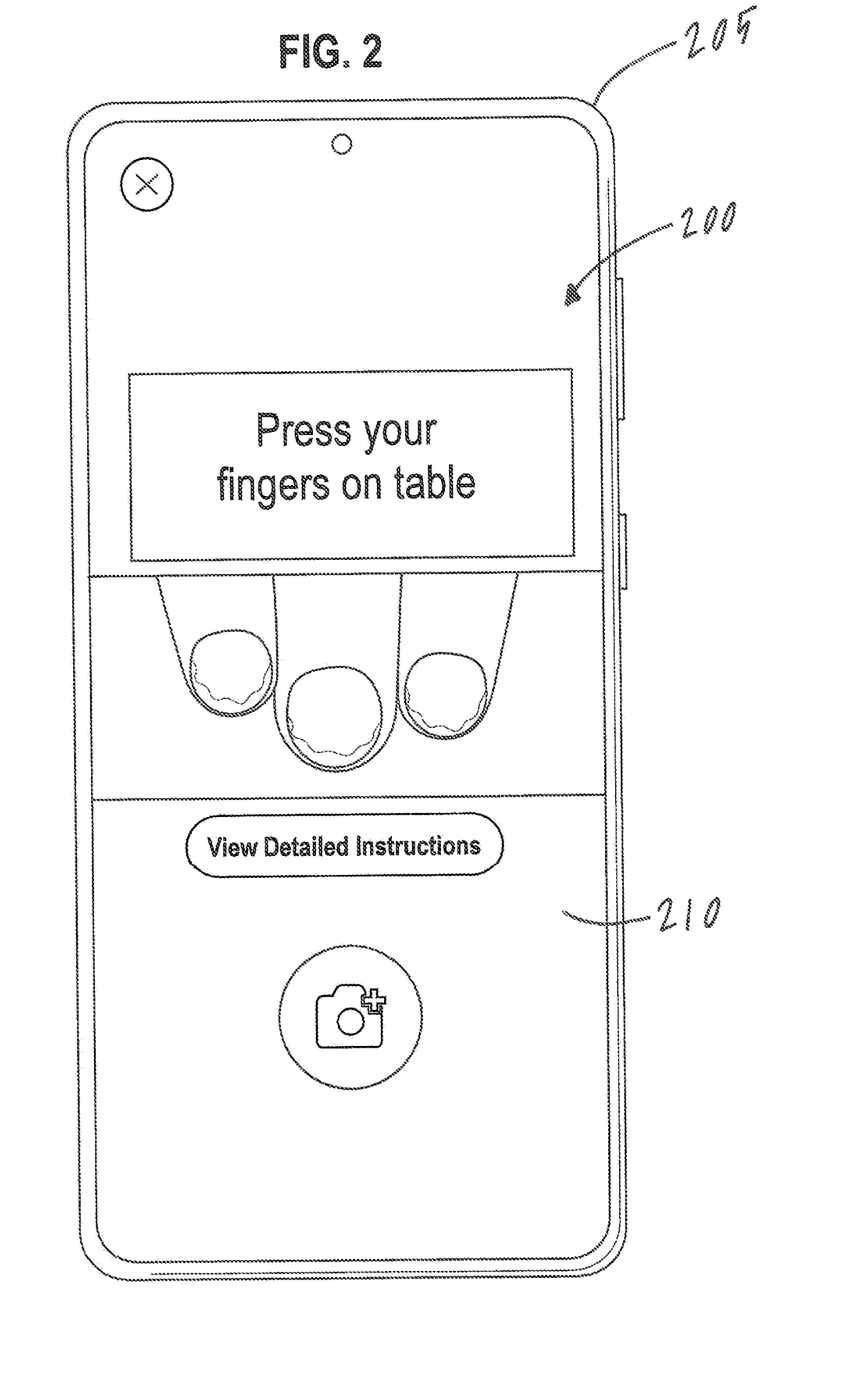
FIG. 2 is a first screen of a graphical user interface according to embodiments of the present disclosure.
Figure 3:
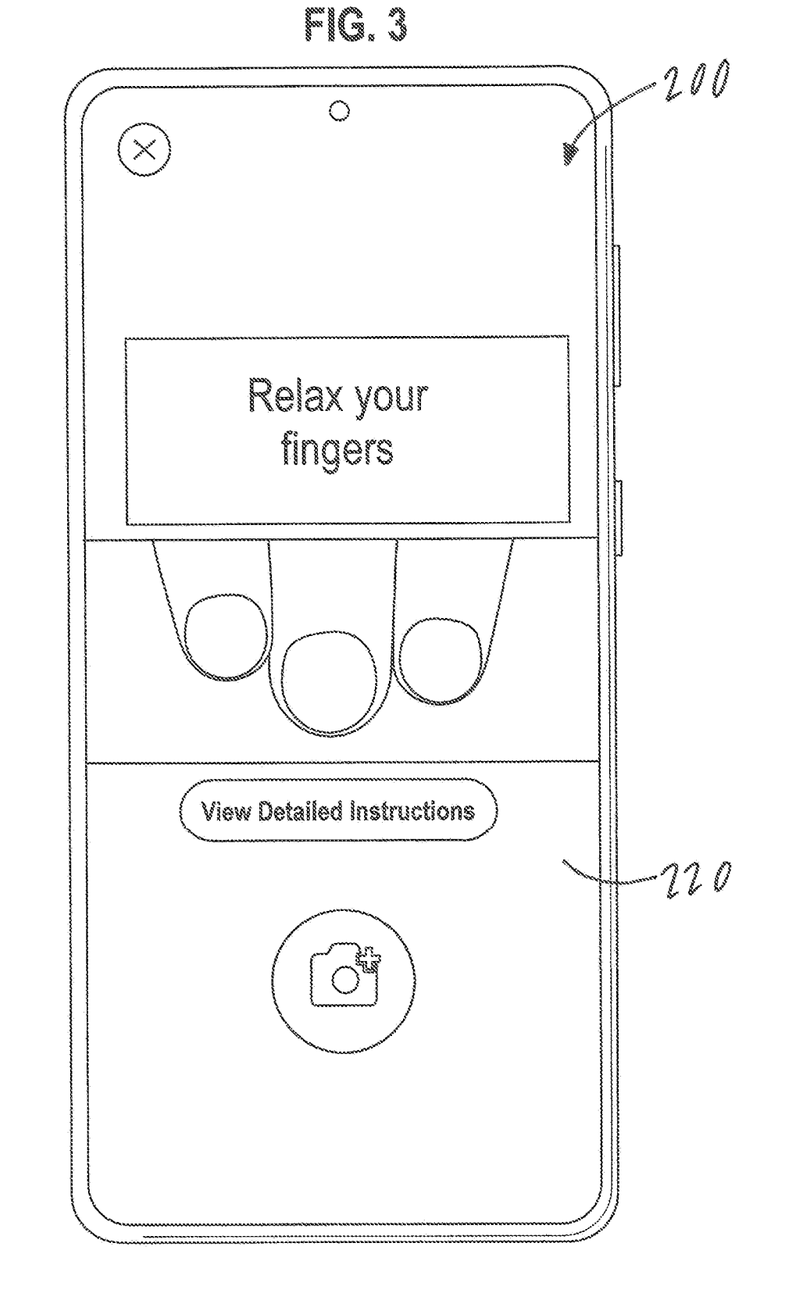
FIG. 3 is a second screen of the graphical user interface according to embodiments of the present disclosure.

According to one embodiment, and as illustrated in FIG. 2, a patient may open an application 200 on the patient's device 205, which may prompt the patient with a first screen 210. The first screen 210 may prompt the patient to press her fingers on a surface in order to blanch the tip of her fingers underneath the nail bed. According to one embodiment, and as illustrated in FIG. 3, a second screen 220 may prompt the patient to relax the patient's fingers and remove the pressure from the fingertip in order to allow the blood to refill under the nailbed. In various embodiments, the camera may record this blanching and relaxing process for further analysis by the system.

Figure 4:
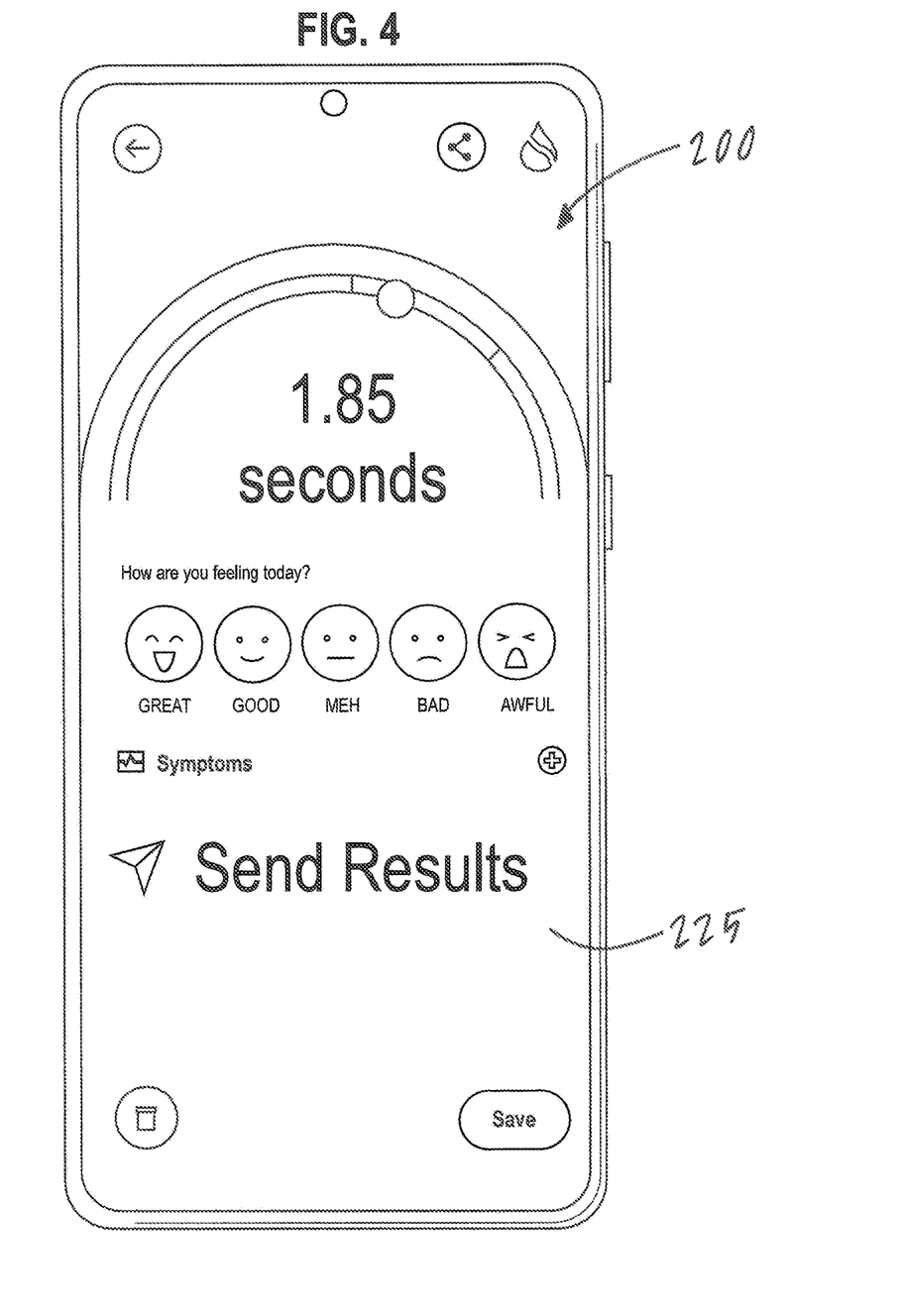
FIG. 4 is a third screen of the graphical user interface according to embodiments of the present disclosure.

After the video is captured, the application 200 may process the video and return results to the patient. The average CRT may be presented to a patient on a third screen 225, as illustrated in FIG. 4. The application 200 may be configured to display whether the average CRT is considered normal or abnormal, to display where on a scale of normal to abnormal that the patient's average CRT falls, to illustrate the patient's average CRT as a percentage of time, etc. The results may be based on high temporal resolution, may be measured on the scale of milliseconds, and may be automatically recorded. According to one embodiment, the patient may be presented with the option to save or send results to a healthcare provider. Further, the patient may be prompted to enter in other information regarding how the patient is feeling that day and to record other symptoms present for that patient at the time of measurement.

In various embodiments, the system described herein may analyze pixel color intensity from a fingernail bed over the time of a video captured by a smartphone (or a subset of the time). The system, in at least one embodiment, may leverage a machine learning model to detect fingernails (or any suitable portion of a patient's body) and/or process image and video data. The machine learning model may be trained by being presented with several images and by collecting data associated with such images. For example, the training may include associating a time factor to a video of the patient's fingernail blanching and being released. The application may be trained to process the video by collecting capillary refill videos from patients with poor perfusion and those with healthy controls and analyzing such data. Further, the training process may allow the application to detect what portion of the image is a patient's fingernail bed. Thus, a patient does not need to be concerned with capturing only a portion of the patient's finger or hand when taking the video. Rather, the patient can simply record an image or video, and the application can detect which portion of the image or video is the fingernail bed which should be further analyzed for pixel color intensity.

Figure 5:
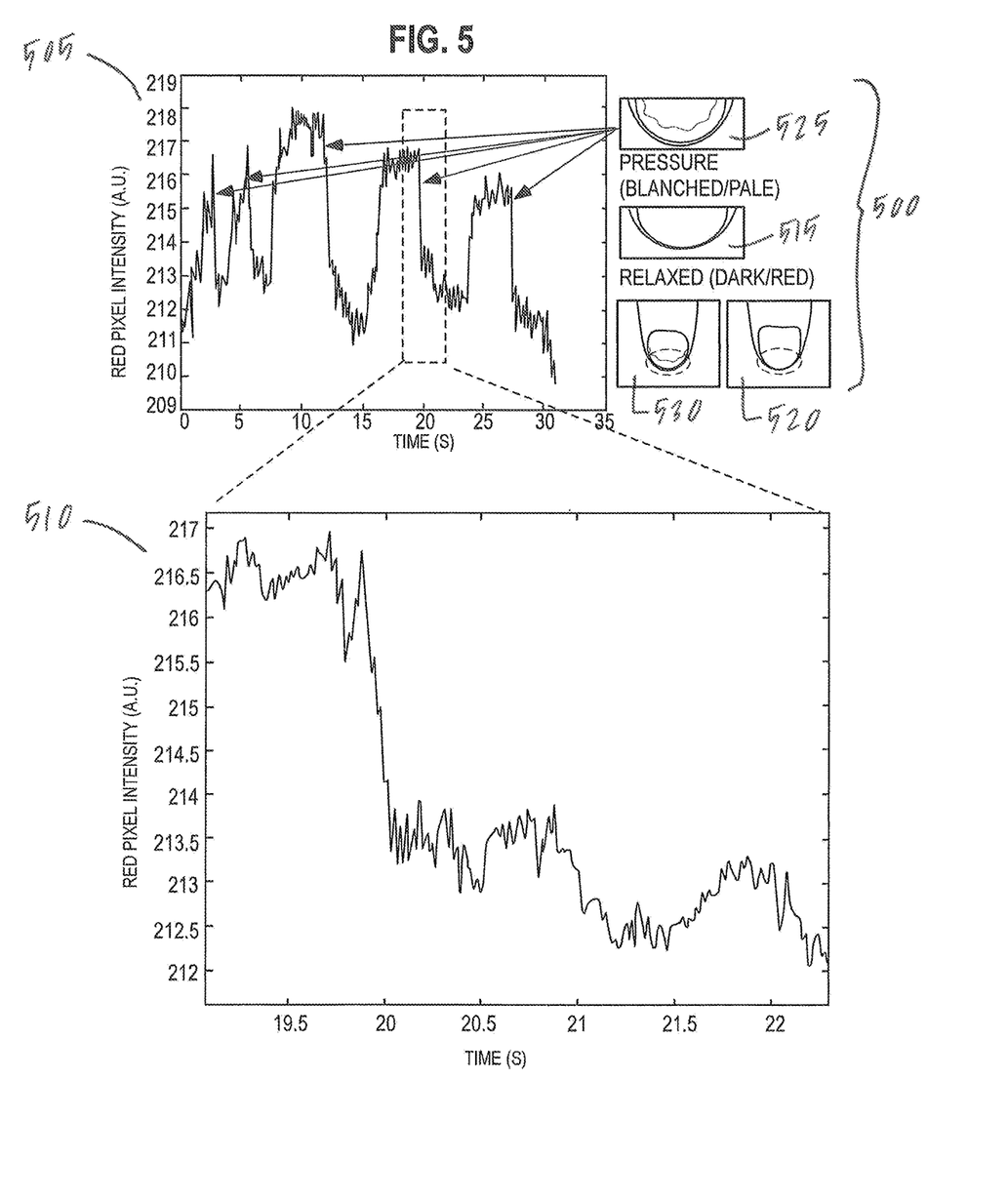
FIG. 5 is a first graph relating red pixel intensity and time according to embodiments of the present disclosure.

A camera on the patient's device may capture a video of several capillary refill cycles by prompting a patient to repeatedly press her fingertips against a table and relaxing them to allow for capillary refill (examples of such process are shown in the exemplary images 500 of FIG. 5). The system may record this data as a graph correlating pixel color intensity with the time of the video. As illustrated in FIG. 5, red color intensity is used. According to one embodiment, the data is illustrated as in graphs 505 and 510.

Peaks on the graphs may correlate to when the fingernail bed is at its maximum pixel color intensity. For example, a peak on the graph may correlate to when the fingernail bed is at its "reddest," indicating completion of a capillary refill. Such peaks associated with the fingernail bed at its "reddest" may illustrate data associated with images 515 and 520, when the patient has relaxed her fingernail and her fingernail is at its "reddest" point. As another example, a peak on the graph may correlate to when the fingernail bed is at its "whitest," indicating that the blanching process has reached its maximum point.

Valleys on the graphs may correlate to when the fingernail bed is at its minimum pixel color intensity. For example, a valley on the graph may correlate to when the fingernail bed is at its "whitest" and when the fingernail bed appears blanched or pale in color, indicating that sufficient pressure has been applied to squeeze blood away from the area. Such valleys associated with the fingernail bed at its "whitest" may illustrate data associated with images 525 and 530, when the patient has applied pressure to her fingernail and her fingernail appears blanched and pale. As another example, a valley on the graph may correlate to when the fingernail bed is at its "reddest," indicating completion of a capillary refill.

In at least one embodiment, the system may compute a capillary refill time based on the time between the peak and the valley. Graphs 505 and 510 show data from a camera capturing video at a rate of 60 frames per second; however, any number of frames per second may be used. The system may be configured to capture video at such a rate, including when the system is processing on a patient's device.

Figure 6:
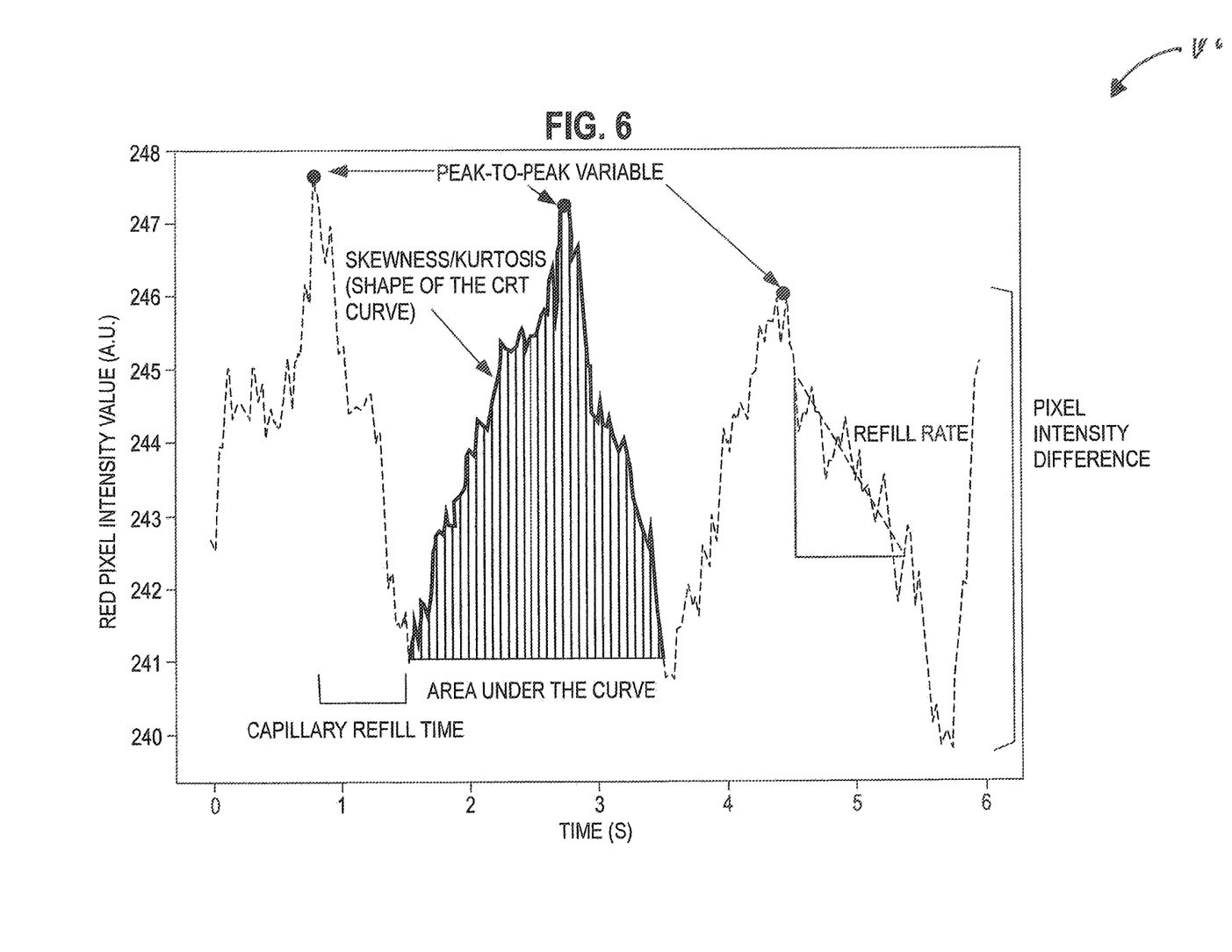
FIG. 6 is a second graph relating red pixel intensity and time according to embodiments of the present disclosure.

Each Q-CRT measurement may result in a color intensity value over time data set, as displayed in graph 600. The system may analyze the Q-CRT data, as well as the shape of the CRT waveform (skew/kurtosis), slope of the curve (refill rate), the area under the curve, peak to peak variability and the color intensity difference between peaks and valleys for each waveform within each measurement. In various embodiments, the peak to peak measurement may be used to measure magnitude variability, distances between peaks, and time distance between peaks. The Q-CRT data may be correlated with clinical symptoms. In one embodiment, the data may be correlated with blood flow to determine how blood flows and determine other clinical indications.

Specifically, the system may correlate differences in color intensity between a nail tip when blanched versus when it is relaxed with the patient's perfusion status. Patients suffering from perfusion issues or anemia may experience more fingertip pallor than healthy patients. Thus, the system may assess the severity of a patient's condition by evaluating the magnitude of the pixel intensity difference. Furthermore, the system may analyze the shape of each CRT curve or "waveform" (skewness/kurtosis) to measure blood flow to the fingertip in real time with millisecond resolution. Thus, the system may generate a waveform indicative of how blood moves into and out of the fingernail bed by correlating the pixel intensity with time.

The system may be configured to determine certain disease states or persistent poor perfusion based on the shape of a waveform, including the slope and presence of peaks and valleys. Further, the system may be configured to analyze Q-CRT data associated with a patient to determine whether a patient has had chronic or acute poor perfusion and to predict future poor perfusion.

Figure 7:
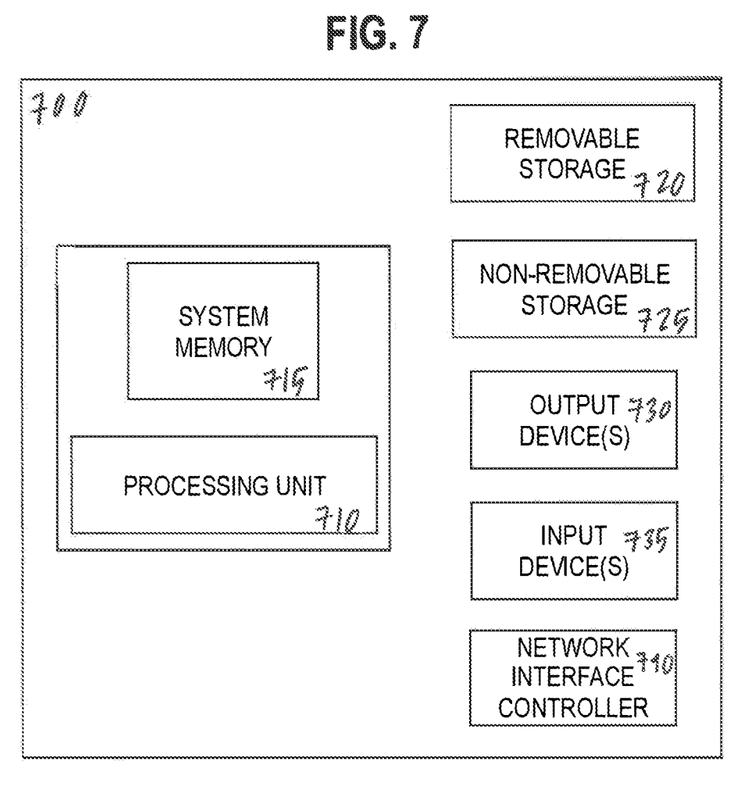
FIG. 7 is a system diagram of a system architecture according to embodiments of the present disclosure.

An example computing device 700 upon which embodiments of this disclosure may be implemented is illustrated. For example, the smartphone, server, or other computer described herein may each be implemented as a computing device, such as computing device 700. It should be understood that the example computing device 700 is only one example of a suitable computing environment upon which embodiments of the disclosure may be implemented. Optionally, the computing device 700 can be a custom or purpose-specific computing system including, but not limited to, personal computers, servers, handheld or laptop devices, multiprocessor systems, microprocessor based systems, network personal computers (PCs), mini computers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, a computing device 700 of FIG. 7 may include two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 700 to provide the functionality of a number of servers that is not directly bound to the number of computers in the computing device 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 700 typically includes at least one processing unit 710 and system memory 715. Depending on the exact configuration and type of computing device, system memory 715 may be volatile (such as random access memory (RAM)), nonvolatile (such as read-only memory (ROM), flash memory, etc.), or some combination of the two. The processing unit 710 may be a standard programmable processor that performs arithmetic and logic operations necessary for operation of the computing device 700. While only one processing unit 710 is shown, multiple processors may be present. Thus, while instructions may be discussed as executed by a processor, the instructions may be executed simultaneously, serially, or otherwise executed by one or multiple processors. The computing device 700 may also include a bus or other communication mechanism for communicating information among various components of the computing device 700. Computing device 700 may have additional features/functionality. For example, computing device 700 may include additional storage such as removable storage 720 and non-removable storage 725 including, but not limited to, magnetic or optical disks or tapes. Computing device 700 may also contain network connection(s) 740 that allow the device to communicate with other devices such as over the communication pathways described herein. The network connection(s) 740 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 700 may also have input device(s) 735 such as a keyboards, keypads, switches, dials, mice, track balls, touch screens, voice recognizers, card readers, paper tape readers, or other well-known input devices. Output device(s) 730 such as a printers, video monitors, liquid crystal displays (LCDs), touch screen displays, displays, speakers, etc. may also be included. The additional devices may be connected to the bus in order to facilitate communication of data among the components of the computing device 700. All these devices are well known in the art and need not be discussed at length here.

The processing unit 710 may be configured to execute program code encoded in tangible, computer-readable media. Tangible, computer-readable media refers to any media that is capable of providing data that causes the computing device 700 (i.e., a machine) to operate in a particular fashion. Various computer-readable media may be utilized to provide instructions to the processing unit 710 for execution. Example tangible, computer-readable media may include, but is not limited to, volatile media, non-volatile media, removable media and non-removable media implemented in any method or technology for storage of information such as computer readable instructions, data structures, program modules or other data. System memory 715, removable storage 720, and non-removable storage 725 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read only memory (EEPROM), flash memory or other memory technology, CD-ROM, digital versatile disks (DVD) or other optical storage, magnetic cassettes, magnetic tape, magnetic disk storage or other magnetic storage devices.

As is evident from the foregoing description, certain aspects of the present disclosure are not limited by the particular details of the examples illustrated herein, and it is therefore contemplated that other modifications, applications, variations, or equivalents thereof, will occur to those skilled in the art. Many such changes, modifications, variations, and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations, and other uses and applications which do not depart from the spirit and scope of the present disclosure are deemed to be covered by the disclosure which are limited only by the claims which follow.

The invention claimed is:

1. A process comprising:
   accessing a camera via an application;
   prompting a user to induce blanching for a time period of 10 seconds;
   processing information from the camera to automatically detect one or more fingernails for each of the one or more fingers;
   accessing video data from the camera, the video data comprising:
      at least 10 frames per second over the time period; and
      a video of the one or more detected fingernails transitioning from a pressure condition to a relaxed condition;
   computing a capillary refill time by:
      computing a point in time of a maximum pixel color intensity for the time period;
      computing a point in time of a minimum pixel color intensity for the time period; and
      computing the capillary refill time between the point in time of the maximum pixel color intensity and the point in time of the minimum pixel color intensity;
   causing a display screen to display the capillary refill time; and
   transmitting the capillary refill time to a computing device.

2. The process of claim 1, wherein the one or more fingers comprise at least two fingers.

3. The process of claim 2, wherein the one or more fingernails comprise at least two fingernails.

4. The process of claim 3, wherein the video data comprises pixel color intensity data for each of the at least two fingers.

5. The process of claim 4, wherein the process further comprises computing:
   a local maximum pixel color intensity for each of the at least two fingers;
   a local minimum pixel color intensity for each of the at least two fingers;
   an average maximum pixel color intensity based on the maximum pixel color intensity for each of the at least two fingers; and
   an average minimum pixel color intensity based on the minimum pixel color intensity for each of the at least two fingers.

6. The process of claim 5, wherein:
   the maximum pixel color intensity comprises the average maximum pixel color intensity; and
   the minimum pixel color intensity comprises the average minimum pixel color intensity.

7. The process of claim 6, wherein processing information from the camera to automatically detect one or more fingernails for each of the one or more fingers comprises processing information via a machine learning model configured to detect at least one fingernail from camera data.

8. The process of claim 7, wherein the machine learning model was previously developed.

9. A process comprising:
accessing a camera;
prompting a user to apply pressure to one or more fingers onto a surface for a time period;
processing information from the camera to automatically detect one or more fingernails for each of the one or more fingers;
prompting a user to release pressure from the one or more fingers;
accessing video data from the camera, the video data comprising a video of the one or more detected fingernails transitioning from a pressure condition to a relaxed condition;
computing a capillary refill time by:
  computing a point in time of a maximum pixel color intensity for the time period;
  computing a point in time of a minimum pixel color intensity for the time period; and
  computing the capillary refill time between the point in time of the maximum pixel color intensity and the point in time of the minimum pixel color intensity; and
causing a display screen to display the capillary refill time.

10. The process of claim 9, wherein accessing the camera comprises accessing the camera via a computing application.

11. The process of claim 10, wherein the one or more fingers comprise at least two fingers.

12. The process of claim 11, wherein the one or more fingernails comprise at least two fingernails.

13. The process of claim 12, wherein the video data comprises pixel color intensity data for each of the at least two fingers.

14. The process of claim 13, wherein the process further comprises computing:
a local maximum pixel color intensity for each of the at least two fingers;
a local minimum pixel color intensity for each of the at least two fingers;
an average maximum pixel color intensity based on the maximum pixel color intensity for each of the at least two fingers; and
an average minimum pixel color intensity based on the minimum pixel color intensity for each of the at least two fingers.

15. The process of claim 14, wherein:
the maximum pixel color intensity comprises the average maximum pixel color intensity; and
the minimum pixel color intensity comprises the average minimum pixel color intensity.

16. The process of claim 15, wherein processing information from the camera to automatically detect one or more fingernails for each of the one or more fingers comprises processing information via a machine learning model configured to detect at least one fingernail from camera data.

17. The process of claim 16, wherein the machine learning model was previously developed.

18. The process of claim 17, wherein the time period comprises about 10 seconds.

19. The process of claim 17, wherein the video data from the camera comprises at least 60 frames per second over the time period.

20. The process of claim 17, wherein the process further comprises transmitting the capillary refill time to a computing device.

* * * * *